United States Patent
Oh

(10) Patent No.: US 9,300,774 B2
(45) Date of Patent: Mar. 29, 2016

(54) MOBILE TERMINAL AND ITS CASE WITH HALL IC DRIVING SHIELD MAGNET

(71) Applicant: Choon-Teak Oh, Seoul (KR)

(72) Inventor: Choon-Teak Oh, Seoul (KR)

( * ) Notice: Subject to any disclaimer, the term of this patent is extended or adjusted under 35 U.S.C. 154(b) by 78 days.

(21) Appl. No.: 14/353,448

(22) PCT Filed: Jan. 3, 2014

(86) PCT No.: PCT/KR2014/000065
§ 371 (c)(1),
(2) Date: Apr. 22, 2014

(87) PCT Pub. No.: WO2015/102132
PCT Pub. Date: Jul. 9, 2015

(65) Prior Publication Data
US 2015/0222736 A1 Aug. 6, 2015

(51) Int. Cl.
*A45C 11/00* (2006.01)
*A45C 13/10* (2006.01)
*H04M 1/26* (2006.01)
*H04M 1/11* (2006.01)
*H04M 1/02* (2006.01)

(52) U.S. Cl.
CPC .................. *H04M 1/11* (2013.01); *A45C 11/00* (2013.01); *A45C 13/1069* (2013.01); *H04M 1/026* (2013.01); *A45C 2011/002* (2013.01)

(58) Field of Classification Search
CPC ........ H04M 1/026; H04M 1/11; A45C 11/00; A45C 13/1069; A45C 2011/002
See application file for complete search history.

(56) References Cited

U.S. PATENT DOCUMENTS

| | | | | |
|---|---|---|---|---|
| 3,800,193 A | * | 3/1974 | Ashar | G01R 33/07 257/422 |
| 5,221,025 A | * | 6/1993 | Privas | B05B 7/168 118/317 |
| 6,728,557 B1 | * | 4/2004 | Tracy | G06F 1/1616 439/13 |
| 6,922,573 B2 | * | 7/2005 | Hijii | H04M 1/0214 324/207.2 |
| 7,209,363 B2 | * | 4/2007 | Liu | E05C 3/004 361/801 |
| 7,831,284 B2 | * | 11/2010 | Lee | H04M 1/04 455/575.1 |
| 8,565,843 B1 | * | 10/2013 | Lugo | H04M 1/04 455/556.1 |
| 8,760,294 B2 | * | 6/2014 | Pertuit | G01R 33/0023 340/500 |
| 9,020,428 B2 | * | 4/2015 | Meunier | H04B 1/401 455/41.1 |
| 2002/0102947 A1 | * | 8/2002 | Hofman | H04M 1/02 455/550.1 |

(Continued)

FOREIGN PATENT DOCUMENTS

JP 2005-277586 A 10/2005
KR 10-2001-0113141 A 12/2001

(Continued)

OTHER PUBLICATIONS

International Search Report mailed Oct. 6, 2014 in counterpart International Application No. PCT/KR2014/000065 (3 pages, in Korean).

*Primary Examiner* — Lewis West
(74) *Attorney, Agent, or Firm* — Park & Associates IP Law, P.C.

(57) ABSTRACT

The present invention relates to a mobile terminal and a corresponding case with a shield magnet for driving a Hall IC of the terminal, in which the case can be used to automatically operate the mobile terminal simultaneously with opening and closing the case by utilizing the magnetic force of the shield magnet which is composed of a yoke and a permanent magnet and attached to the case.

14 Claims, 4 Drawing Sheets

(56) References Cited

U.S. PATENT DOCUMENTS

| | | | | |
|---|---|---|---|---|
| 2003/0189489 | A1* | 10/2003 | How | G08B 13/2408 340/572.6 |
| 2005/0134258 | A1* | 6/2005 | Kogure | G01D 5/14 324/207.25 |
| 2006/0116183 | A1* | 6/2006 | Infanti | A45F 5/00 455/575.8 |
| 2006/0202679 | A1* | 9/2006 | Kogure | F02D 11/106 324/207.11 |
| 2007/0107652 | A1* | 5/2007 | Michida | A44B 19/262 116/137 R |
| 2008/0073192 | A1* | 3/2008 | Lee | H04M 1/04 200/333 |
| 2009/0098827 | A1* | 4/2009 | Koyama | H01Q 1/243 455/41.2 |
| 2010/0271018 | A1* | 10/2010 | Clinton | G01R 33/07 324/252 |
| 2010/0308822 | A1* | 12/2010 | Prado | G01N 24/08 324/309 |
| 2011/0159919 | A1* | 6/2011 | Kim | G02B 7/08 455/556.1 |
| 2011/0294470 | A1* | 12/2011 | Pasquero | H04B 1/3888 455/412.2 |
| 2012/0068919 | A1* | 3/2012 | Lauder | G06F 1/1656 345/156 |

FOREIGN PATENT DOCUMENTS

| | | |
|---|---|---|
| KR | 10-2007-0046223 A | 5/2007 |
| KR | 10-0800802 B1 | 2/2008 |
| KR | 10-2011-0016281 A | 2/2011 |
| KR | 10-2012-0029543 B1 | 3/2012 |
| KR | 10-1168644 B1 | 7/2012 |

* cited by examiner

MOBILE TERMINAL AND ITS CASE WITH HALL IC DRIVING SHIELD MAGNET

FIELD OF INVENTION

The present invention relates to a mobile terminal (e.g., a cellular phone) and its case with a Hall IC driving shield magnet, and more particularly, to a cellular phone and its case with a Hall IC driving shield magnet in which the cellular phone case has a permanent magnet and a yoke coupled thereto for controlling magnetic force of the permanent magnet in order to automatically operate a corresponding cellular phone coupled to the cellular phone case as a Hall IC in the cellular phone is driven by the magnet at the time of opening and closing the cellular phone case.

BACKGROUND OF THE INVENTION

In general, as the size of a liquid crystal display of a cellular phone (mobile communication terminal), such as a smart phone and a tablet PC, increases, various forms of cellular phone cases are manufactured in order to protect a screen and an exterior of the cellular phone by being mounted on the corresponding cellular phone.

Among them, representatively, a wallet form of cellular phone case is most widely used, which is made of leather or artificial leather to cover front and rear surfaces and one surface of a corresponding cellular phone, and expose a screen of the corresponding cellular phone while a front surface part is selectively opened and closed.

However, since the aforementioned cellular phone case in the related art does not have a separate function which interworks with the cellular phone in addition to protecting the screen and the exterior of the cellular phone and providing an aesthetic design, there is a limit in providing additional conveniences to a user through the cellular phone case.

Thus, the convenience of the user may be significantly increased if a function to operate the smart phone in link with the cellular phone case is added to the protective cellular phone case.

SUMMARY OF THE INVENTION

Accordingly, the present invention is contrived to solve the problems in the related art and an object of the present invention is to provide a mobile terminal (e.g., a cellular phone) and its case with a Hall IC driving shield magnet in which a yoke and a permanent magnet having a specific structure are incorporated in a cellular phone case to automatically operate a corresponding cellular phone simultaneously with opening and closing the cellular phone case, thereby increasing the convenience of a user.

In order to achieve the above object, the present invention provides a cellular phone case with a Hall IC driving shield magnet, in which the phone case is mounted on a cellular phone in such a manner to cover a front surface, a rear surface, and one side surface of the cellular phone to protect an exterior of the corresponding cellular phone, in which the shield magnet implemented through a permanent magnet and a yoke is configured to be incorporated at a point of a front surface part of the cellular phone case corresponding to a Hall IC incorporated in the cellular phone.

One of the poles of the shield magnet is sealed by the yoke, and the magnetic force is reduced (shielded) to have a strength in the range of 20 to 96% in the closed pole covered by the yoke. On the other hand, the magnetic force is strengthened to have a strength in the range of 105 to 180% in the open pole not covered by the yoke, as compared with Eigen surface Gauss of the corresponding permanent magnet.

According to one preferred embodiment, the permanent magnet has a rectangular parallelepiped shape, and the yoke has a quadrangular plate shape, or the rectangular parallelepiped shape corresponding to the permanent magnet, or a rectangular parallelepiped shape of which the top is opened to receive the permanent magnet through the open top.

According to another preferred embodiment, the permanent magnet has a cylindrical shape, and the yoke has a disk shape or the cylindrical shape corresponding to the permanent magnet or a cylindrical shape of which the top is opened to receive the permanent magnet through the open top.

According to the present invention configured as described above, a Hall IC, which applies a sensing signal for operating a device in a mobile communication terminal such as a smart phone or a tablet PC, is incorporated along with a shield magnet having a specific structure, which is used to drive the Hall IC is incorporated in a cellular phone case, and as a result, a corresponding cellular phone is automatically operated simultaneously with opening and closing the cellular phone case, thereby increasing the convenience of a user.

Further, as a shield magnet configured as a yoke and a permanent magnet having a specific structure is adopted, there is an effect that a function to drive the Hall IC of the cellular phone can be implemented by a small magnet, and there is also an effect that the yoke can effectively prevent a misoperation of the Hall sensor which may otherwise occur when a front surface part of the cellular phone case is bent back to a rear surface part.

DETAILED DESCRIPTION OF THE INVENTION

Herein, the present invention configured as described above will be described in detail with reference to the drawings.

Figure 2:
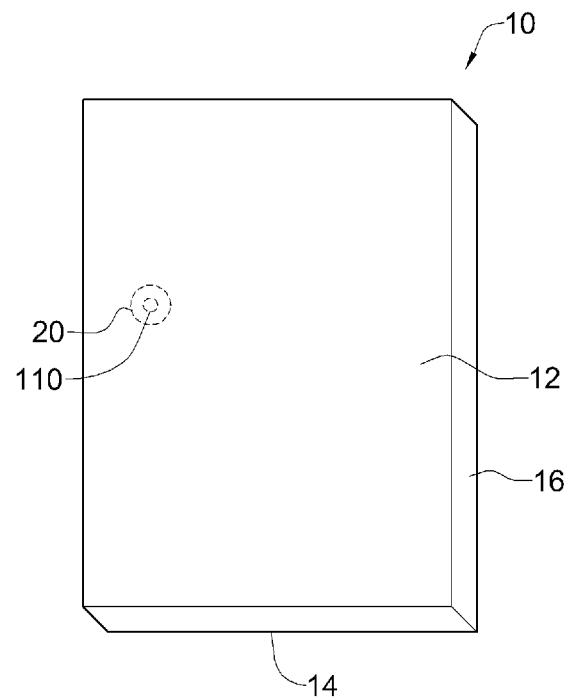
FIG. 2 is a perspective view illustrating an exterior of a cellular phone case with a Hall IC driving shield magnet according to the present invention.
Figure 3A:
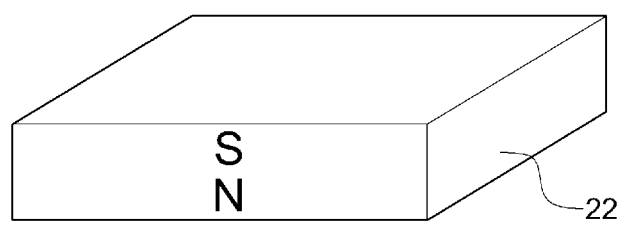
FIGS. 3a and 3b are diagrams illustrating one example of the permanent magnet and the yoke of the shield magnet applied to the cellular phone case with the Hall IC driving shield magnet according to the present invention.
Figure 3B:
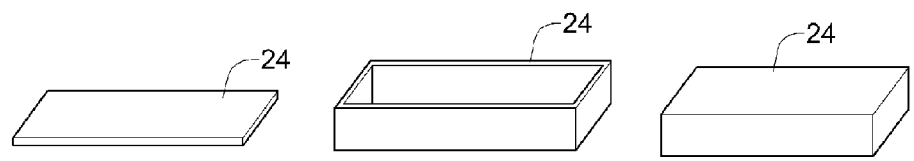
Figure 4A:
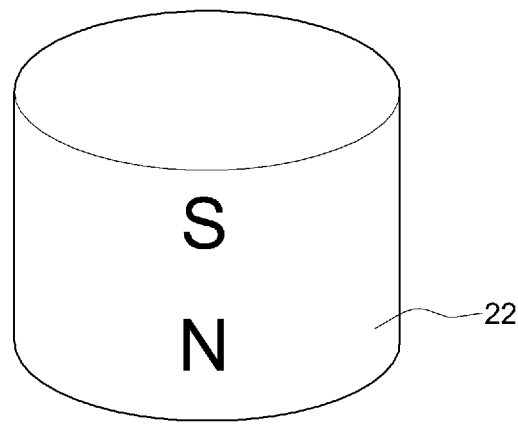
FIGS. 4a and 4b are diagrams illustrating another example of the permanent magnet and the yoke of the shield magnet applied to the cellular phone case with the Hall IC driving shield magnet according to the present invention.
Figure 4B:
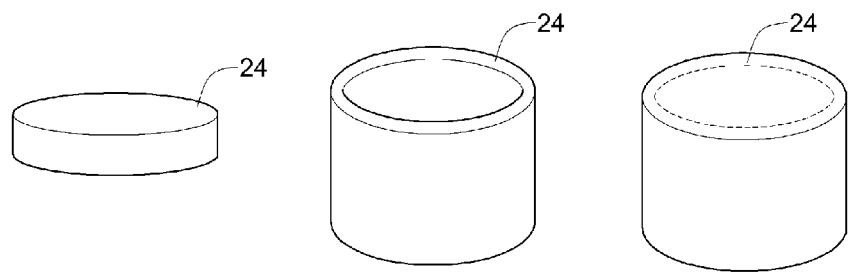
Figure 5A:
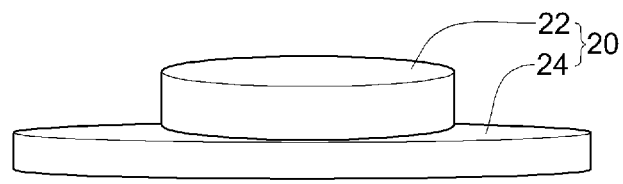
FIGS. 5a to 5c are diagrams illustrating various embodiments of the shield magnet applied to the cellular phone case with the Hall IC driving shield magnet according to the present invention.
Figure 5B:
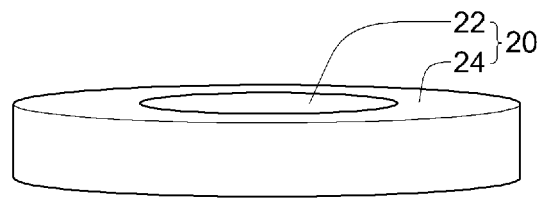
Figure 5C:
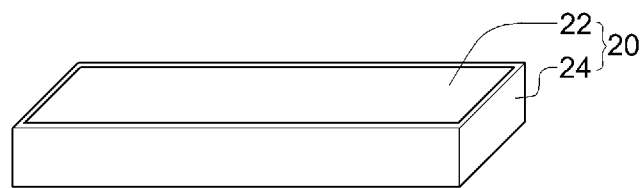
Figure 6A:
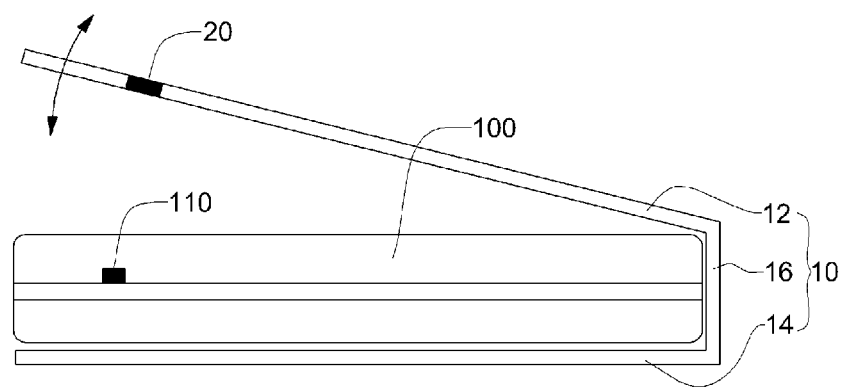
FIGS. 6a and 6b are cross-sectional views illustrating a use state of the cellular phones case with the Hall IC driving shield magnet according to the present invention.
Figure 6B:
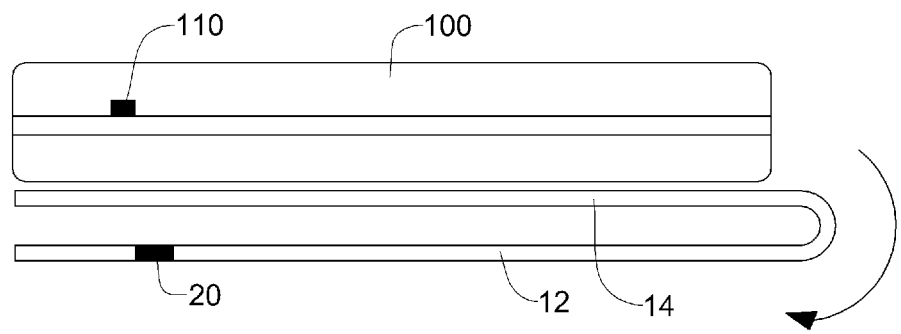

FIG. 2 is a perspective view illustrating an exterior of a cellular phone case with a Hall IC driving shield magnet according to the present invention. FIGS. 3a and 3b are diagrams illustrating one example of the permanent magnet and the yoke of the shield magnet applied to the cellular phone case with the Hall IC driving shield magnet according to the present invention, FIGS. 4a and 4b are diagrams illustrating another example of the permanent magnet and the yoke of the shield magnet applied to the cellular phone case with the Hall IC driving shield magnet according to the present invention, FIGS. 5a to 5c are diagrams illustrating various embodiments of the shield magnet applied to the cellular phone case with the Hall IC driving shield magnet according to the present invention, and FIGS. 6a and 6b are cross-sectional views illustrating a use state of the cellular phones case with the Hall IC driving shield magnet according to the present invention.

The cellular phone case with the Hall IC driving shield magnet according to the present invention is used to automatically operate a corresponding cellular phone 100 by sensing opening (open/on) and closing (closed/off) states of a cellular phone case 10 simultaneously with opening and closing the cellular phone case 10 by incorporating a shield magnet 20 having a specific structure, which is constituted by a permanent magnet 22 and a yoke 24 in the cellular phone case 10.

The cellular phone case with the Hall IC driving shield magnet according to the present invention is applied to a cellular phone case made of leather or artificial leather, which is constituted by a front surface part 12 and a rear surface part 14, and a side surface part 16 in such a manner to cover a front surface and a rear surface, and one side surface of the cellular phone 100.

To this end, a Hall IC (Hall effect sensor) 110 that generates a predetermined sensing signal by magnetic force having a predetermined magnitude is incorporated in mobile communication terminals 100 such as a smart phone or a tablet PC, while the shield magnet 20 implemented by the permanent magnet 22 and the yoke 24 is incorporated on the front surface part 12 side of the cellular phone case 10 at a point corresponding to the Hall IC 110 in the cellular phone 100.

Figure 1A:
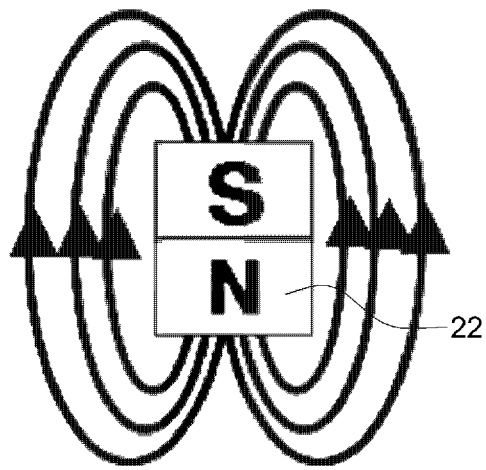
FIGS. 1a to 1c are diagrams illustrating a flow of a magnetic field of a regular permanent magnet (FIG. 1a) and a permanent magnet with a yoke combined (FIGS. 1b and 1c).
Figure 1B:
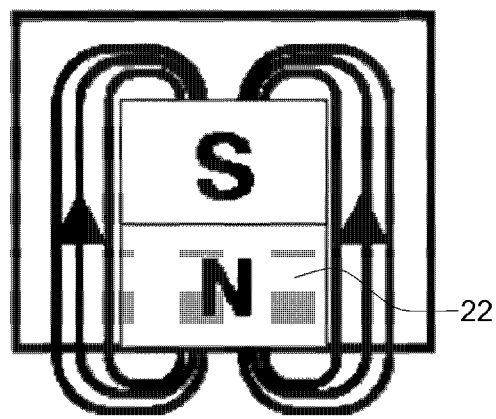
Figure 1C:
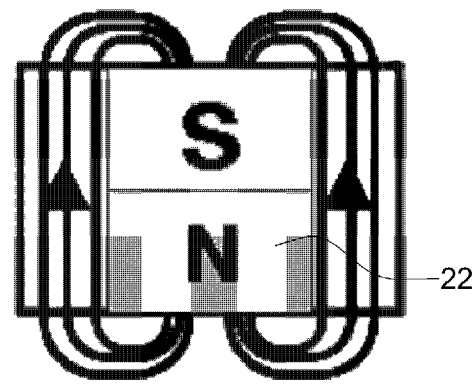

As well known, regular magnetic force lines are formed in the permanent magnet as illustrated in FIG. 1a, but when the permanent magnet is covered by a metal yoke having high magnetic permeability, magnetic force lines illustrated in FIGS. 1b and 1c are shown according to a shape of the yoke.

That is, in a magnetic field of the permanent magnet, the attraction force and repulsion force that react are differently shown depending on metal, and levels thereof vary depending on permeability of the metal. When high-permeability metal gets closer to the permanent magnet, a flow of the magnetic field is changed and depending on the shape and thickness of the metal, directionality of the magnetic field through induction of the flow of the magnetic field may be changed.

Therefore, the material, the thickness, the shape, and the like of the yoke can be changed according to levels of strengthening and shielding of the magnetic force. The yoke may be integrally combined with the permanent magnet, and as a result, a strengthening rate and shielding rate of the corresponding shield magnet may be changed.

Herein, according to the present invention, the shielding magnet 20 applied to the cellular phone case 10 may be designed in such a manner that in a pole covered by the yoke 24 having the specific structure, a magnetic force shielding is shown to have a magnetic strength in the range of approximately 20 to 96%, and in an opened pole not interfered by the yoke 24, a strengthened magnetic force is shown to have a magnetic strength in the range of approximately 105 to 180%, as compared with Eigen surface Gauss of the corresponding permanent magnet 22.

The material of the yoke 24 is selected by considering the permeability of metal and the thickness and the shape of the yoke and may be designed according to the magnetic force and the size of the permanent magnet 22.

In one exemplary embodiment of the present invention, the permanent magnet 22 has a rectangular parallelepiped shape, and the yoke 24 similarly has a quadrangular plate shape, or the rectangular parallelepiped shape corresponding to the permanent magnet, or a rectangular parallelepiped shape of which the top is opened to receive the permanent magnet through the open top (see FIGS. 3a and 3b).

In another exemplary embodiment, the permanent magnet 22 has a cylindrical shape, the yoke 24 similarly has a disk shape, or the cylindrical shape corresponding to the permanent magnet, or a cylindrical shape of which the top is opened to receive the permanent magnet through the open top (see FIGS. 4a and 4b).

That is, as illustrated in FIGS. 5a to 5c, the yoke 24 may be configured to cover or seal one end surface (FIG. 5a) or a side (or circumferential) surface (FIG. 5b), or one end and circumferential surfaces (FIG. 5c) of the permanent magnet 22 of various shapes, and the material of the yoke is preferably a soft ferrite magnetic metal having high permeability.

Now, an operation of the present invention configured as described above is described below with reference to the drawings.

Various types of mobile communication terminals 100 such as various cellular phones including a smart phone, a tablet PC, and the like are mounted in the cellular phone case with the Hall IC driving shield magnet according to the present invention, in which the Hall IC 110 that generates a sensing signal for operating the corresponding device is incorporated in a substrate of the mobile communication terminal 100.

As the user opens the front surface part 12 of the cellular phone case 10 in which the mobile communication terminal 100 such as the cellular phone is mounted, a magnetic force signal from the permanent magnet of the shield magnet 20 incorporated in the cellular phone case 10 is detected by the Hall IC 110, and utilizing the detected signal, the corresponding cellular phone 100 is controlled to be automatically operated.

Thereafter, when the corresponding mobile communication terminal 100 is used, in the case where a user applies external force to allow the front surface part 12 of the cellular phone case 10 to be bent backward and overlapped with the rear surface part 14 as illustrated in FIG. 6b, the magnetic force of the permanent magnet 22 is effectively shielded and not applied to the Hall IC 110 due to the yoke 24, and as a result, an arbitrary misoperation of the shield magnet 20 can be prevented.

Further, when the cellular phone case 10 is closed by returning the front surface part 12 of the cellular phone case 10 to an original position thereof, the corresponding cellular phone is controlled to be automatically turned off as the magnetic force signal from the permanent magnet 22 of the shield magnet 20 is detected through the Hall IC 110 incorporated in the corresponding mobile communication terminal 100.

Thus, according to the present invention, the shield magnet 20 provided on a front surface of the cellular phone case can effectively provide a sufficient magnetic force signal on the front surface side of the mobile communication terminal 100 for operating the Hall IC, and a malfunction of the Hall IC 110 can be prevented as the magnetic force signal is decreased through the yoke 24 on the rear surface side of the terminal.

Although modified examples other than contents disclosed in the present invention appear, the modified examples should not individually be understood from the technical spirit and prospect of the present invention, and the modified examples can be included in the scope of the appended claims.

REFERENCE NUMERALS OF DRAWINGS

10: Case (e.g., cellular phone case)
12: Front surface part
14: Rear surface part
16: Side surface part
20: Shield magnet
22: Permanent magnet
24: Yoke
100: Mobile communication terminal (e.g., cellular phone)
110: Hall IC

The invention claimed is:

1. A case for a mobile terminal with a Hall IC mounted in the terminal, the case comprising:
   a front cover portion, a rear cover portion, and a side cover portion, the front, rear, and side cover portions of the case configured to cover an exterior of a mobile terminal which is to be detachably attached to the case; and
   a shield magnet attached to the front cover portion of the case, the shield magnet including a magnet and a yoke coupled together,
   wherein the yoke is coupled to the magnet in a manner that a first pole of the magnet is covered or enclosed by the yoke, thus defining a closed pole therewith, and that a second pole of the magnet is at least partially not covered by the yoke to have an open face, thus defining an open pole therewith,
   wherein a magnetic force in the closed pole of the magnet is reduced due to the yoke, and a magnetic force in the open pole of the magnet is strengthened due to the yoke,
   wherein the shield magnet is attached to the front cover portion of the case at a position corresponding to the Hall IC of the mobile terminal in a manner that the open pole of the magnet faces the Hall IC, such that when a user opens the front cover portion of the case, the open pole of the magnet facing the Hall IC provides a strengthened magnetic force to its facing Hall IC of the mobile terminal to generate a sensing signal for automatically operating the mobile terminal, and when the user further opens and bends the front cover portion of the case backward to overlap with the rear cover portion of the case, the closed pole of the magnet faces the Hall IC of the mobile terminal, and the magnetic force of the magnet is reduced or shielded by the yoke of the closed pole and not sufficiently applied to the Hall IC, thus preventing a misoperation of the Hall IC.

2. The case of claim 1, wherein in the closed pole, the magnetic force is reduced to have a strength in the range of 20 to 96%, and in the open pole, the magnetic force is strengthened to have a strength in the range of 105 to 180%, as compared with Eigen surface Gauss of the magnet used.

3. The case of claim 2, wherein the magnet has a rectangular parallelepiped shape, and
   the yoke has a quadrangular plate shape or the rectangular parallelepiped shape corresponding to the magnet, or a rectangular parallelepiped shape of which the top is opened.

4. The case of claim 2, wherein the magnet has a cylindrical shape, and
   the yoke has a disk shape or the cylindrical shape corresponding to the magnet or a cylindrical shape of which the top is opened.

5. The case of claim 1, wherein the magnet has a rectangular parallelepiped shape, and the yoke has a quadrangular plate shape or the rectangular parallelepiped shape corresponding to the magnet, or a rectangular parallelepiped shape of which the top is opened.

6. The case of claim 1, wherein the magnet has a cylindrical shape, and the yoke has a disk shape or the cylindrical shape corresponding to the magnet or a cylindrical shape of which the top is opened.

7. The case of claim 1, wherein the yoke is configured to seal or cover one face surface, or a side surface, or one face surface with one or more side surfaces of the magnet.

8. The case of claim 1, wherein a material of the yoke is implemented by soft ferrite magnetic metal having high permeability.

9. A mobile terminal with a case, comprising:
   a terminal body with a Hall IC mounted in the terminal body;
   a case having a front cover portion, a rear cover portion, and a side cover portion, wherein the front, rear, and side cover portions of the case are configured to cover an exterior of the terminal body; and
   a shield magnet attached to the front cover portion of the case, the shield magnet including a magnet and a yoke coupled together,
   wherein the yoke is coupled to the magnet in a manner that a first pole of the magnet is covered or enclosed by the yoke, thus defining a closed pole therewith, and that a second pole of the magnet is at least partially not covered by the yoke to have an open face, thus defining an open pole therewith,
   wherein a magnetic force in the closed pole of the magnet is reduced due to the yoke, and a magnetic force in the open pole of the magnet is strengthened due to the yoke,
   wherein the shield magnet is attached to the front cover portion of the case at a position corresponding to the Hall IC of the mobile terminal in a manner that the open pole of the magnet faces the Hall IC, such that when a user opens the front cover portion of the case, the open pole of the magnet facing the Hall IC provides a strengthened magnetic force to its facing Hall IC of the mobile terminal to generate a sensing signal for automatically operating the mobile terminal.

10. The mobile terminal of claim 9, wherein when the user further opens and bends the front cover portion of the case backward to overlap with the rear cover portion of the case, the closed pole of the magnet faces the Hall IC of the mobile terminal, and the magnetic force of the magnet is reduced or shielded by the yoke of the closed pole and not sufficiently applied to the Hall IC, thus preventing a misoperation of the Hall IC.

11. The mobile terminal of claim 10, wherein in the closed pole, the magnetic force is reduced to have a strength in the range of 20 to 96%, and in the open pole, the magnetic force is strengthened to have a strength in the range of 105 to 180%, as compared with Eigen surface Gauss of the magnet used.

12. The mobile terminal of claim 10, wherein the magnet has a rectangular parallelepiped shape, and Wherein the yoke has a quadrangular plate shape or the rectangular parallelepiped shape corresponding to the magnet, or a rectangular parallelepiped shape of which the top is opened.

13. The mobile terminal of claim 10, wherein the magnet has a cylindrical shape, and wherein the yoke has a disk shape or the cylindrical shape corresponding to the magnet or a cylindrical shape of which the top is opened.

14. The mobile terminal of claim 9, wherein the yoke is configured to seal or cover one face surface, or a side surface, or one face surface with one or more side surfaces of the magnet.

* * * * *